Figure 1:
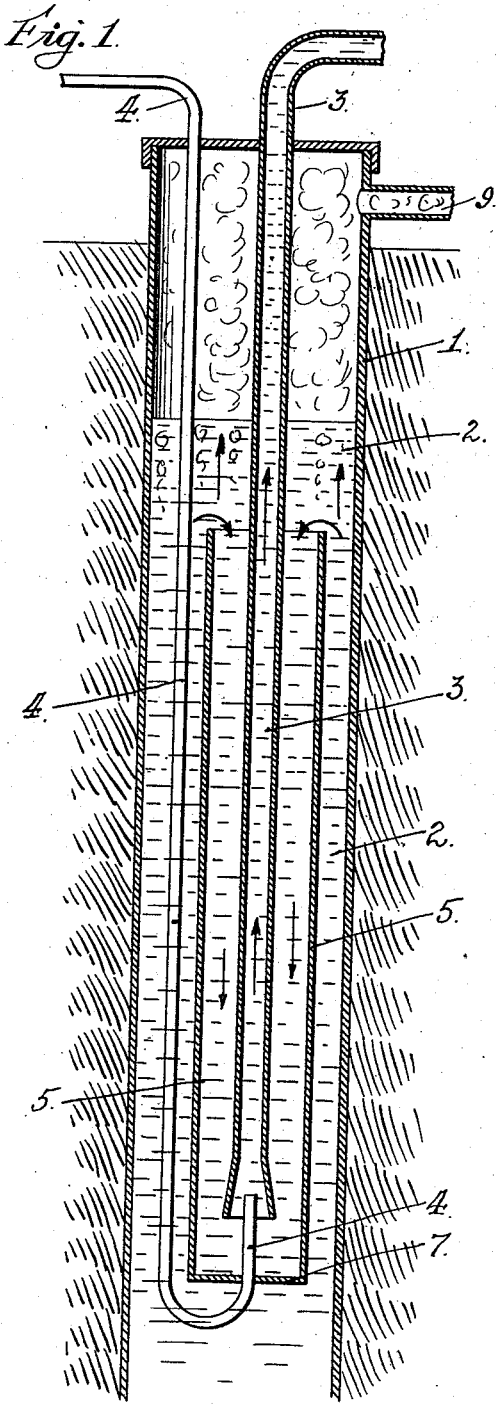

A. S. COOPER.
APPARATUS FOR OBTAINING GAS FROM WELLS.
APPLICATION FILED JAN. 13, 1910.

1,000,669.

Patented Aug. 15, 1911.

Witnesses:
Arthur L. Slee.
S. Constine.

Inventor:
Augustus Steiger Cooper
by Wm. F. Booth
his Attorney.

UNITED STATES PATENT OFFICE.

AUGUSTUS STEIGER COOPER, OF LOS OLIVOS, CALIFORNIA.

APPARATUS FOR OBTAINING GAS FROM WELLS.

1,000,669.  Specification of Letters Patent.  Patented Aug. 15, 1911.

Application filed January 13, 1910. Serial No. 537,861.

*To all whom it may concern:*

Be it known that I, AUGUSTUS STEIGER COOPER, a citizen of the United States, residing at Los Olivos, in the county of Santa Barbara and State of California, have invented certain new and useful Improvements in Apparatus for Obtaining Gas from Wells, of which the following is a specification.

My invention relates to apparatus for the recovery of gas from wells.

Natural gas, which under pressure of a column of liquid, whether of water or oil or both, is held in solution in said liquid, will be liberated by a decrease of pressure as the liquid either flows or is pumped toward the surface of the well. This is in accordance with the law that the greater the pressure, the larger the volume of gas held in solution by a liquid. This liberation of the gas in flowing wells is thus to be expected and its recovery needs the intervention of no art other than that required for its collection. But where wells have ceased to flow, or have never been flowing wells, and the gas is held in solution by the pressure of the liquid column and will not, therefore, free itself, it has been found that it will be liberated if the pressure be decreased by lifting or pumping the liquid to the surface of the well. For a like reason, wells which flow but a small amount of liquid can, by these means, be made to increase their flow of gas in proportion to the increased flow of the liquid, due to the lifting or pumping.

For the purpose of raising the liquid to the surface, the air-lift, for many reasons is well adapted. This consists, as is well known, of air introduced under pressure beneath a liquid column in the up-lift or flow pipe. In the usual arrangement of the air-lift, the intake being at the bottom of the column, the liquid is drawn from the lower portion of the well, the result of which is to take that liquid which holds in solution the greatest volume of gas and lift it through the flow pipe to the surface and thus liberate the gas. But this has the disadvantage of contaminating the gas with air and rendering it useless, so that it has been found that an air-lift as commonly arranged is not practicable.

At one time, I devised a method of utilizing the principle of the air-lift, but in order to avoid the deleterious effect of mixing the air with the gas, I used for the lift, the natural gas itself, which I obtained as the process proceeded, by directing part of the gas recovered, to the compresser for use in the lift, the surplus being taken for general use, as will be seen by reference to my Patent No. 753,045, dated Feby. 23, 1904.

My present invention contemplates the use of the air-lift; but applied in a wholly different manner or relation from that of its common application and arrangement, whereby I am able to take for and subject to the air-lift the liquid from the upper portion of the well, from which liquid the gas has been liberated by the decrease of pressure. By so doing, I cause a constant movement of the liquid in the well, to the upper portion, where it liberates the gas, and then proceeds down again practically free of gas, in another column, to the air-lift. There is thus no gas to be contaminated by the air-lift, the function of which is fully subserved by causing the upward movement in the well to a point main body of liquid in the well to a point where, by decrease of pressure, its gas will be liberated and will flow naturally from the upper portion of the capped well, to its destined use.

My invention will be more fully understood by reference to the accompanying drawings in which—

Figure 2:
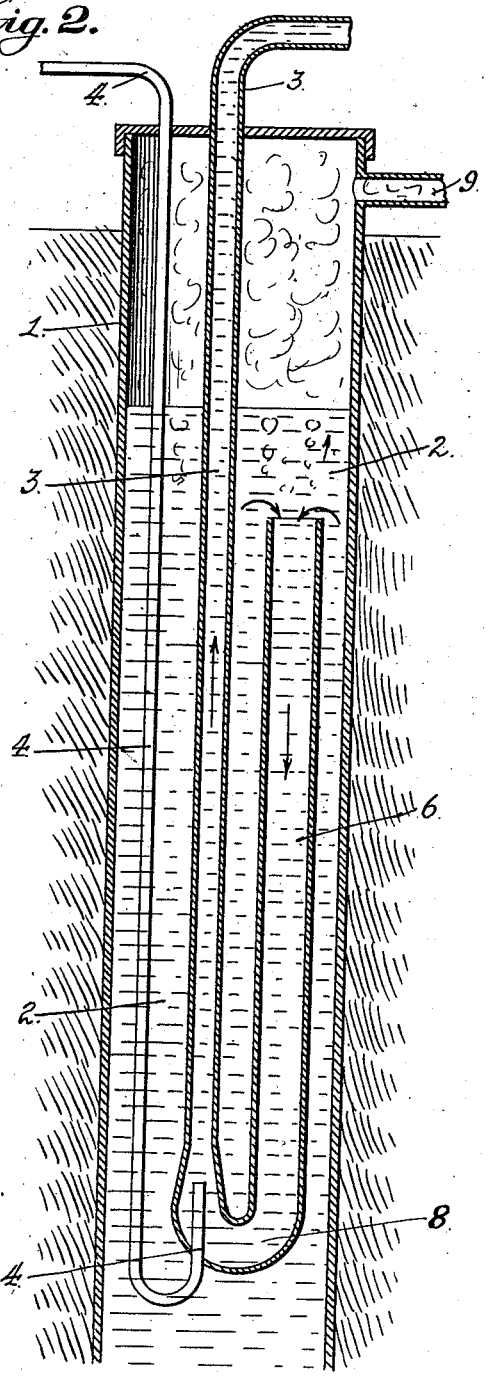

Figure 1 is a vertical section of the apparatus. Fig. 2 is a vertical section showing a slight constructive modification.

1 is the well.

2 is the column or body of liquid, either water or oil or both, in the well.

3 is the flow pipe leading from near the bottom of the well, through its cap above, to a suitable delivery.

4 is an air pipe, leading from a suitable compressor, not shown, down through the well cap, into the well and to near its bottom where it is upturned into the lower end of the flow pipe. If this were all of the apparatus, the process would be to draw the liquid from the bottom of the well and lift it, with its gas in solution, through the flow pipe, to the surface, where, owing to the relief of pressure, the gas would be liberated. But under such process the gas would be useless, because of being mixed with the air used in the lift. To carry out my present invention, I introduce into the apparatus a down-take column, formed either as in Fig. 1, by a sleeve 5, which surrounds the flow pipe, or as in Fig. 2, by a separate pipe 6. These open near the upper part of the liquid column in the well, and at their lower end they inclose the lower end of the flow pipe 3, by a bottom cap 7, as in Fig. 1, or by an elbow 8, as in Fig. 2, the air pipe 4 being introduced through said cap or elbow.

It will now be seen that instead of drawing from the bottom of the column the liquid, as shown by the arrows, is drawn from the upper part of said column. The effect of this is that there is a constant movement of liquid in the well from the bottom to the top of the main liquid column 2. Owing to the relief or decrease of pressure above, the gas is liberated into the top of the well and will flow off for use through a pipe 9. The liquid nearly freed from gas will descend in sleeve 5 or pipe 6 as the case may be and be raised to the surface by the air-lift, through the flow pipe 3. By this method of drawing from the top instead of from the bottom, the gas may be recovered without contact with the air-lift. If desired a more complete separation of the gas may be had by establishing a partial vacuum in the upper part of the well.

Having thus described my invention what I claim as new and desire to secure by Letters Patent is—

An apparatus for the recovery of gas from wells consisting of a well casing provided above the liquid column with a gas outlet, of a continuously open flow pipe extending down from the surface of the well to the vicinity of its bottom and closed at its lower end to the liquid of the lower portion of the liquid column in said well, a second continuously open pipe, the upper end of which is open to the liquid of the upper portion of said liquid column and thence extending down in the well, its lower end communicating with the lower end of the flow pipe to deliver thereto liquid only from the upper portion of the liquid column, a pipe extending from a source of air pressure down into the well and provided at its lower end with an upturned portion projecting into the lower end of the flow pipe and adapted to deliver a stream of air under pressure therein.

In testimony whereof I have signed my name to this specification in the presence of two subscribing witnesses.

AUGUSTUS STEIGER COOPER.

Witnesses:
DALLAS D. DAVIS,
DANIEL S. BRANT.